July 6, 1948.   G. HITE ET AL   2,444,890
SELF-SYNCHRONOUS FREQUENCY DIVIDER
Filed Dec. 4, 1943
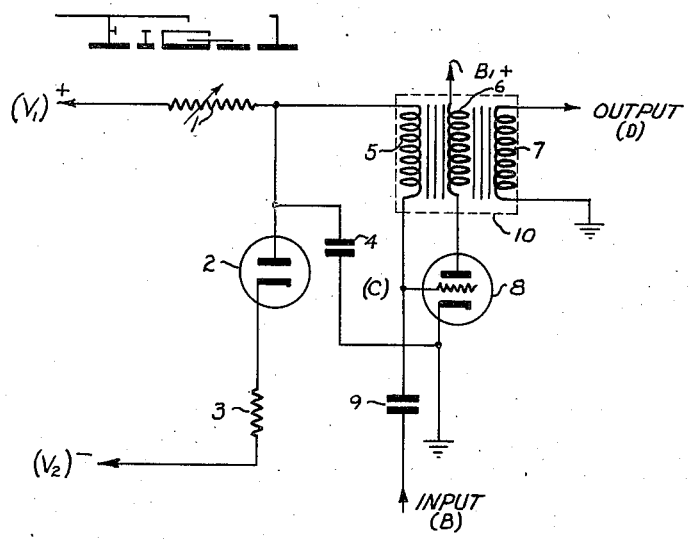
FIG. 1
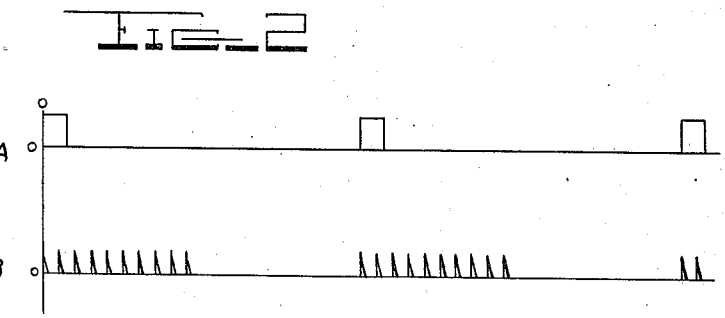
FIG. 2
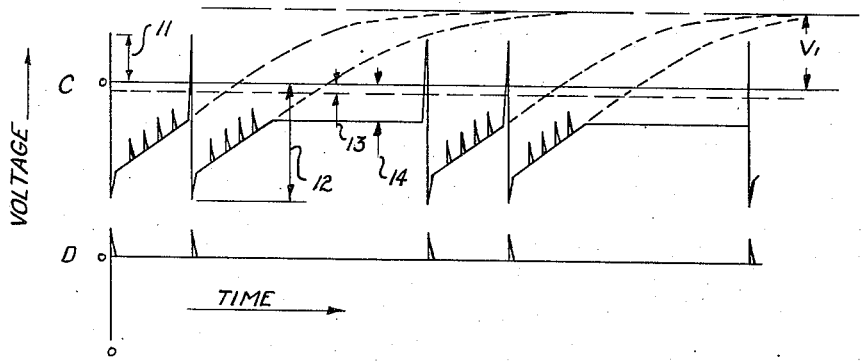
Inventor
GLEN E. WHITHAM
GEORGE HITE
By *J. J. Fitzgerald*
Attorney Patented July 6, 1948

2,444,890

UNITED STATES PATENT OFFICE 2,444,890

SELF-SYNCHRONOUS FREQUENCY DIVIDER

George Hite, Dorchester, and Glenn E. Whitham, Wollaston, Mass., assignors, by mesne assignments, to the United States of America as represented by the Secretary of the Navy Application December 4, 1943, Serial No. 512,930

4 Claims. (Cl. 250—36)

The present invention relates to improvement in the method of frequency division whereby the frequency of the pulses in a train of a series of repeating trains is divided by a predetermined factor, the first of the pulses at the divided frequency occurring in coincidence with the first of a train.

The invention further relates to means for producing calibrated range marks on a cathode ray tube indicator in radio-echo detection range-measuring systems. Such detection systems may be of the type which radiate a train of pulses of ultra-high-frequency energy and which receive echo signals from remote reflecting objects at a time later than the time of transmission of each given pulse, the time interval between transmission of a discrete pulse and receipt of an echo being a function of the range to the reflecting object. The manner of measuring this time interval, or the range to specific reflecting objects, preferably consists in starting a linear sweep trace on the screen of a cathode ray tube indicator in time coincidence with the inception of each pulse of ultra-high-frequency energy transmitted and noting the distance the linear sweep trace has covered between that time and the time of receipt of an echo signal. This distance will be a measure of the range to the reflecting object, and in the use thereof calibrating range markers may be evenly spaced along this linear sweep to make readily observable the length of said time interval. In one application, these range marks may be rendered visible on the cathode ray tube screen by intensifying the electron beam at predetermined intervals during its linear sweep across the cathode ray tube screen, which gives rise to spots of brighter intensity of light at the position of the sweep during which these intensifications occurred. In the production of suitable intensifying voltage impulses, one procedure is to utilize the oscillations of an accurately calibrated oscillation generator, the output waves of which are sharply peaked at a given point in each cycle, such as the beginning point. Great sharpness which results in the voltage impulses is highly desired to give good resolution of the range-marking spots on the cathode ray tube screen.

More often than not the pulses of ultra-high-frequency energy from a radio-detection system are spaced so far apart as to preclude the feasibility of using the portion of the time interval between transmitted pulses in studying the searched region. One of the reasons for this lies in the need for a certain amount of recovery time in the indicating components of the system just before each transmitted pulse is generated. That is, if the pulse repetition rate is, say, 500 cycles per second, the time interval between pulses will correspond to approximately 200 land miles of maximum range possible. It will be desirable to use, say, the first 10 or 100 miles, or both of this maximum possible range in the operation of such a system. Consequently, it will be necessary for the range-marking oscillator to be operating only during this first portion of the time interval between successive transmitted pulses of ultra-high-frequency energy, starting each of these groups of range-marker voltage impulses with the start of each transmitted pulse. The desirability of being able to produce these markers at more than one particular range spacing is apparent. For example, if the cathode ray tube is operating with a 10 mile range sweep at one particular time, it might be desirable to employ range markers spaced one mile apart. When the range sweep length is changed from 10 to say 100 miles a desirable spacing for the markers will now be at 10 mile intervals. Since but one calibrated range-marking oscillator is generally available the use of a synchronized frequency divider must be looked to.

Most of the frequency dividers that have been available in the past art are of a fee running type which are entirely unsuitable for the application herein proposed. The present invention provides the means to do frequency dividing on a self-synchronous basis, in which the divided frequency output will be synchronized with a predetermined repeating function.

It is, therefore, the object of this invention to provide means for self-synchronous frequency division, and the means by which this is accomplished will be described in the following discussion as supported by the accompanying drawings of which, Fig. 1 is a circuit digaram, showing an embodiment of the invention.

Fig. 2 is a voltage-time graph illustrating the operation of the embodiment of Fig. 1.

With reference to Fig. 1, tube 8 is connected in a form of blocking oscillator circuit. Such a form of blocking oscillator may include a transformer similar to the three winding type shown at 10, in which one end of the middle winding 6 is connected to the plate of tube 8 while the other end is connected to the positive terminal $B_1$ of a potential source, winding 7 is grounded at one end and the other end is connected to the output terminal of the frequency divider, winding 5 is connected at one end to the grid of tube 8 and at the other to the junction of resistor 1, the plate of diode tube 2, and condenser 4. The other side of condenser 4 is connected to ground while the resistor 1 is connected further to the positive terminal $V_1$ of a source of voltage. The cathode of diode 2 is connected through resistor 3 to a suitable source of potential $V_2$, which may be negative as it is here employed. Potentials $V_1$ and $V_2$ function in the device to determine the bias voltage at the grid of tube 8. The input pulses to the frequency-dividing circuit are coupled to the grid 8 through condenser 9.

To facilitate the understanding of the operation in Fig. 1, Fig. 2 is provided and should be constantly referred to. Fig. 2 is divided into four approximate voltage-time plots which are drawn with the same time scale and reference axis. Plot A illustrates the timing of the pulses of ultrahigh-frequency energy transmitted by a radio-detection range-measuring system such as the type previously described in brief. Although the invention is not limited by any means to such a system, it may be simply described on this basis. Plot B shows the range-marking impulses which are to be divided in frequency. It will be noted that the general case is taken in which the train of pulses starts with the start of the pulse of transmitted energy from the detection system and ends at a time considerably before the start of the next transmitted pulse from this system. Plot C shows the variation in voltage at the grid of tube 8. Pot D is a graph of the output voltage pulses from the dividing circuit. When tube 8 is not conducting the bias voltage appearing on its grid is fixed by the potential dividing circuit consisting of resistor 1 in series with diode 2 and resistor 3, the ends of this series circuit being connected respectively to $V_1$ a positive source of voltage and $V_2$ a negative source of voltage, and is of such a negative value as that shown at 14 in Fig. 2. Voltage 13 represents the grid cut-off voltage of tube 8, while $V_1$ represents the voltage of the positive potential source in Fig. 1.

In the operation of the circuit in Fig. 1, the grid of tube 8 is normally biased to a negative value, as mentioned, such that the tube is nonconducting. At the receipt of a positive voltage impulse at the grid of tube 8, such as the first of the series of pulses of B in Fig. 2, tube 8 will immediately start to conduct, assuming this pulse to be of sufficient magnitude as to cause the grid voltage to exceed the cut-off value 13. In blocking oscillator fashion, due to the feed-back through the transformer windings 5 and 6 from plate to grid, the grid voltage is driven considerably positive such as voltage 11 of Fig. 2. On the negative swing of grid voltage, as by an amount 12, the plate voltage rises sharply to form a sharp pulse. A negative pulse of voltage is formed at the plate of tube 8 which becomes positive when transformed in transformer 10, and approximately at its ending the grid voltage of tube 8 is driven considerably negative beyond cut-off such as to a value 12 of Fig. 2. During this violent transient at the grid of tube 8 condenser 4 offers negligible impedance to ground and the voltage between the grid of tube 8 and its cathode is substantially that induced in winding 5 of transformer 10 and reaches a negative value 12. Condenser 4 does not follow the extremely rapid reversal in voltage but charges to a value somewhat less than 12 in a very short time just after the negative grid swing is substantially complete.

When the blocking action is terminated the grid voltage rises in exponential fashion (determined primarily by the discharge of condenser 4) from a magnitude 12 and at a rate determined by the time constant of the circuit comprising resistor 1 and condenser 4. During the early portion of this rise the positive input voltage pulses intermittently "kick" the grid voltage up for an intsant to a higher value momentarily interrupting the exponential rise, which resumes its normal course until the receiept of the next input pulse. In the case of Fig. 2, four of these pulses occur between the time of the blocking oscillator action and the time when a "critical" pulse once again fires tube 8. It is necessary that one of these short input pulses extend beyond the cut-off voltage of the tube characteristic to cause conduction.

The time constant of this RC circuit is made such that, in cooperation with the bias voltage 14, the potential of the grid during its exponential rise reaches the bias value 14 approximately at the time the critical firing input pulse occurs, and then tends to level off and remain constant at potential 14. By adjusting this time constant, the output frequency of the dividing circuit may be varied. Since the exponential rise of potential at the grid of tube 8 tends to continue on upwards to a maximum value $V_1$, and since it abruptly levels off to the value of voltage 14 by the action of diode 2, which conducts at this point, the portion of the exponential curve utilized is an approximately linear one and adjustments in the time constant of the RC circuit will produce a nearly linear change in the output frequency over a considerable, but limited range.

It will be noted in Fig. 2 that the frequency division is by a factor of 5. Were it not for the bias voltage 14 the exponential rise in potential at the grid of the tube 8 would continue on up beyond the cut-off region after the last input pulse had occurred and fire the tube once more. This would immediately destroy the synchronism of the system and there would be no correlation between the output pulses from the blocking oscillator transformer and the transmitted pulses from the radio-detection system in this instance except in the special case where the output frequency of the divider is a multiple of the pulse recurrence frequency in the radio-detection system. It is thus apparent that the special action of diode 2 and its associated circuit is instrumental in providing the self-synchronous feature of the system by preventing the blocking oscillator from functioning in the time interval between the last pulse in a train of pulses and the first pulse in the next succeeding train.

Although the circuit is shown in its simplest form for ease in understanding, various modifications and changes may be made without departing from the fundamental principles involved. For instance, the input pulses may be coupled to the plate of tube 8 with equal satisfaction.

The invention may be adapted to divide the frequency of a series of sine waves as well as a series of pulses and will have the same selfsynchronous feature.

What we desire to claim and obtain by Letters Patent is:

1. In electronic apparatus adapted to divide the frequency of a repeating wave-form, a vacuum tube having at least an anode, a cathode, and a control grid and having a grid cut-off potential, said anode being connected through a plate inductance to the positive terminal of a source of potential, said cathode being connected to the negative terminal of said source, said control grid being connected to the source of said repeating wave-form and to one end of a grid inductance said grid inductance being mutually inductive with said plate inductance in such manner as to cause an increase in plate current to produce an increase in the potential of said grid, the other end of said grid inductance being connected through a resistor to the positive terminal of a second source of potential and to the anode terminal of a rectifying means and through a condenser to the cathode of said vacuum tube, the cathode terminal of said rectifying means being connected through a second resistor to the negative terminal of said second source of potential, the potential of said last-mentioned negative terminal being more negative than said grid cut-off potential such that the difference between the two last-mentioned potentials is moderately less than the amplitude of said repeating function, an output circuit coupled to the plate circuit of said vacuum tube, whereby the output circuit provides a second repeating wave-form an integral number of times lower in frequency than the frequency of said first repeating wave-form as long as it shall exist, and is always in synchronism with the initiation of the first cycle of said first wave-form.

2. Apparatus in accordance with claim 1 in which the first-mentioned resistance is variable to control the frequency of said second repeating wave-form.

3. In self-synchronous electronic apparatus for dividing the frequency of a repeated voltage wave form, a blocking oscillator including an electron tube having at least an anode, a control grid and a cathode, means for applying said repeated wave form to said control grid, means for applying a bias voltage to said control grid, said biasing means comprising a potential dividing circuit including a first resistor, a rectifying means and a second resistor connected in series between the positive and negative terminals of a potential source, said control grid being connected through an inductance to the junction of said first resistor and said rectifying means, and thence through a condenser to the cathode of said electron tube, said bias voltage being of such magnitude as to cause said electron tube to conduct with the first cycle of a series of cycles of said wave form, said first resistor and said condenser functioning as a time constant circuit to prevent said electron tube from conducting during a predetermined time interval following a conduction period, an anode inductance mutually coupled to said grid inductance, and an output circuit coupled to said anode inductance, whereby a synchronous frequency division in the form of a second repeating wave form of sub-multiple frequency of said first-mentioned repeating wave form is obtained.

4. Apparatus in accordance with claim 3 in which said first resistor is variable to control the frequency of said second repeating wave form.

GEORGE HITE.
GLENN E. WHITHAM.

REFERENCES CITED

The following references are of record in the file of this patent:

UNITED STATES PATENTS

| Number | Name | Date |
| --- | --- | --- |
| 1,733,614 | Marrison | Oct. 29, 1929 |
| 1,950,400 | Curtes | Mar. 13, 1934 |
| 2,168,403 | Geiger | Aug. 8, 1939 |
| 2,221,452 | Lewis | Nov. 12, 1940 |
| 2,250,706 | Geiger | July 29, 1941 |
| 2,255,403 | Wheeler | Sept. 9, 1941 |

FOREIGN PATENTS

| Number | Country | Date |
| --- | --- | --- |
| 486,017 | Great Britain | May 27, 1938 |